United States Patent [19]

Colaiacovo et al.

[11] Patent Number: 5,069,966

[45] Date of Patent: Dec. 3, 1991

[54] ORGANIC COATING FOR METALS

[75] Inventors: Ferdinando Colaiacovo, Rome; Domenico Derchi, Pomezia; Massimo Memmi, Rome, all of Italy

[73] Assignee: Centro Sviluppo Materiale SpA, Rome, Italy

[21] Appl. No.: 353,525

[22] Filed: May 18, 1989

[30] Foreign Application Priority Data

May 18, 1988 [IT] Italy ............................... 47977 A/88

[51] Int. Cl.$^5$ .................................................. B32B 15/08
[52] U.S. Cl. .................................... 428/336; 428/457; 252/396; 427/410
[58] Field of Search ................. 428/457, 458, 336; 252/396; 427/410

[56] References Cited

U.S. PATENT DOCUMENTS

| | | | |
|---|---|---|---|
| 4,701,382 | 10/1987 | Pichant | 428/457 |
| 4,729,791 | 3/1988 | Laura et al. | 428/457 |
| 4,849,297 | 7/1989 | Mamsell et al. | 428/457 |

FOREIGN PATENT DOCUMENTS 0084843 5/1982 Japan .................................. 428/457

*Primary Examiner*—Merrell C. Cashion, Jr.
*Assistant Examiner*—Hoa Thi Le
*Attorney, Agent, or Firm*—Young & Thompson

[57] ABSTRACT

The present invention provides a thin continuous organic coating on metals, particularly on continuous metal bodies, so that the product obtained is weldable and resistant to corrosion as well as to the effect of strongly acid and strongly alkaline baths, while being punchable and paintable. The coating according to the invention comprises epoxy resins characterized by ultimate elongation higher than 10%, electrical insulation resistance less than 2000 Ohm/cm$^2$, able to produce a continuous coating on the metal substrate with microroughnesses (Ra) of about 3 µm—Ra being average roughness—and capable of withstanding for thirty minutes liquids with pH between 2 and 12.5.

5 Claims, No Drawings

ORGANIC COATING FOR METALS

Present invention refers to an organic coating for metals such as Fe, Al and Cu, for instance, particularly continuous metal bodies like wires, strips or sheets, particularly of steel.

Such metal bodies are usually subjected to protective surface treatment.

In particular, steel sheet used in the automotive industry to produce car bodies must possess very high resistance to cosmetic and perforating corrosion, so it may be subjected to zinc-based surface treatments, after which it is painted.

In the case of such coatings, the Zn, which is sacrificial vis-à-vis Fe, oxidizes in the place of the latter. However, as the products of Zn oxidation have a high surface area, they produce blisters that adversely affect the appearance of the covering paintwork.

Moreover, during mechanical deformation and forming, electrogalvanized sheets tend to produce a large quantity of debris (powdering). Consequently, the surface of the sheet becomes marked and pitted and the coating is lost, so the amount of protection is decreased.

In order to improve corrosion resistance, therefore, organic coatings have been developed that can be applied directly to the bare sheet or to sheet that has been coated as indicated above. It has been found that the thickness of the organic coatings is a critical parameter, because although a thick coating increases corrosion resistance, it also reduces sheet weldability.

When applied in very thin layers (e.g. 2 $\mu$m or less), organic coatings obtained with conventional resins have been considered unsatisfactory from the corrosion point of view (see pages 81 to 90 of SAE December 1986). The same article describes the development of thick organic coatings containing metal fillers which are added to obtain a good compromise between corrosion resistance and weldability when applied to metals. However, these fillers further intensify the quantity of powder produced during forming, hence aggravating the problems of sheet pitting. Furthermore, the fillers tend to settle out when the resin is being applied, causing serious applications problems. An improvement in the field of organic coatings has been made with the introduction of silicate-modified resins as described on pages 49 to 54 of Nippon Kokan Technical Report Overseas No 34 (1982). But although these resins are applied in very thin layers, even in the order of 1 $\mu$m, and are satisfactory from the weldability aspect, they are unsatisfactory where corrosion is concerned, especially following the alkaline degreasing to which the sheet is subjected after car-body assembly.

This unsatisfactory behaviour probably stems from poor adhesion of the organic coating to the metal, very likely because of coating deterioration in an alkaline medium. Furthermore, because of the high temperature required for curing the resins employed, there is a decline in the mechanical properties of the metal substrate.

Quite evidently, therefore, an organic coating is needed that has better characteristics than those previously known.

A continuous organic coating has been developed, as per this invention, for application to metals, especially continuous metal bodies, the coating being thin and such that the ensuing coated product is weldable, resistant to corrosion and to the effects of strongly acid and strongly alkaline baths, as well as being punchable and paintable. The coating which forms the object of this invention includes organic resins characterized by ultimate elongation greater than 10%, electrical insulation resistance less than 2000 Ohm/cm$^2$, ability to produce a continuous coating on the metal substrate, around thirty minutes resistance to liquids with a pH in the 2 to 12.5 range, and capability of coating micro-roughnesses (Ra) of about 3 $\mu$m, where Ra is the average roughness parameter. Hot or cold cross-linking or non cross-linking resins which can be applied as-is or dissolved in solvent or in a dispersion so as to produce continuous coatings with a thickness of 2 $\mu$m or less and preferably between 0.5 and 1 $\mu$m can be advantageously used for this purpose.

If the selected resin is of the hot cross-linking type, the resin should preferably cure at temperatures no higher than 200° C. Resins with a curing rate not exceeding two minutes are preferred.

The resins as per this invention can be applied for instance by dispersing them in an aqueous vehicle or by dissolving them in suitable solvents such as ketones, ethers, alcohols and in known aliphatic and aromatic compounds in general.

The resins can be applied on the metal substrate using known techniques such as, for instance, electrophoresis. However, the following known methods are particularly advantageous for obtaining uniform coatings having a constant thickness of between 0.5 and 2.0 $\mu$m on continuous sheet:
  dipping the sheet in the coating bath containing the resins and regulation of thickness by means of grooved or sanded squeeze rollers
  coating using applicator rollers of the coil-coating type with a system of two or more rollers In the case of this particular procedure, tests have been made on rollers with different degrees of hardness using solutions or dispersions containing resins of various viscosities.

It has been found that the best results as regards thickness and continuity of the deposited resin layer are obtained with rubber applicator rollers of hardness between 35 and 60 Shore A, and with the resin solution or dispersion at a viscosity between 2 and 100 cP at 25° C., preferably 2 to 20 cP.

Resin adhesion to the metal substrate can be improved by known treatments such as chromate passivation, mixed oxide conversion and phosphating or by treatments like that described in U.S. Pat. No. 4,547,268.

A particularly interesting method of embodiment of the invention involves the use of epoxy resins:
  in organic solvents such as cellosolve, methyl ethyl ketone, isobutyl alcohol, and curable with amines, amine adducts, phenolic resins, isocyanates and polysulphides known to the experts working in the field
  in aqueous dispersion, applicable also via electrophoresis and curable with blocked isocyanates or melamine catalyzers, also known.

Some formulations within the ambit of the present invention are indicated below:

Formulation 1

A) Solid epoxy resin (epoxy equivalent 500) in 2 to 20% solution by weight in a solvent consisting of:
2 parts by weight of methyl isobutyl ketone
4 parts by weight of xylene
1 part by weight of isobutyl alcohol.

B) Isolated polyamine adducts in 50% solution by weight (equivalent active H about 370) in solvent consisting of:
4 parts by weight of xylene
4 parts by weight of polyglycol monomethyl ether
1 part by weight of isobutyl alcohol.
A-B mixing ratio of 100/75.

Hardening can occur by curing at room temperature where needed for particular production problems or preferably at a temperature of 180° C.

Formulation 2

A) Solid epoxy resin (epoxy equivalent 1500-2000) in 3 to 20% solution in solvent consisting of:
1 part by weight of diacetone alcohol or cellosolve
1 part by weight of toluene or cellosolve acetate B) Phenolic resin, 70% by weight in butyl alcohol.

B is added to A in quantities equal to 60-70% of A. Hardening occurs in the presence of known basic accelerators equal to 0.1-0.5% by weight of the mix at temperatures between 160° and 200° C.

Coatings as per the invention, applied on metal substrates at thicknesses of less than 2 μm, are continuous and cause no welding problems. Furthermore the coated bodies give excellent results when subjected to mechanical working, such as bending, deep drawing and forming. These bodies also acquire greater corrosion resistance and compatibility with such organic materials as cataphoretic and noncataphoretic paints applied subsequently.

A further advantage of products coated as per the invention stems from the fact that their use results in a decrease in the consumption of phosphating reagents used in the automotive industry, since these come to be applied only on such metal parts as are not resin coated.

The use of protective and forming oils is also eliminated. Then, too, companies engaged on the production of household electrical appliances or on coil coating can advantageously use products coated as per the invention, since they can thus eliminate from the manufacturing process surface conversion treatments prior to painting. Plants can therefore be simpler and there are also ecological advantages, since polluting baths do not have to be used. To explain the invention in greater detail a number of examples are given, but these must in no way be construed as limiting the scope and purposes of the invention. The tests were performed on 0.75 mm thick steel specimens, two-side galvanized with Zn thickness of about 8 μm and roughness Ra of 1.8 to 2.0 μm.

The organic coating was applied to these specimens whose surfaces were activated through mixed oxide surface conversion obtained by using Italbonder's commercial product, Bonderite.

The application was made by dipping the specimens in the solution described as Formulation 1, the thickness of the resins being controlled by two squeeze rollers.

The average thickness of resin on the specimens was 0.8 μm. The results of the characterization tests on the specimens coated as per the invention were compared with the corresponding results for bare specimens without any organic coating.

I Resistance to degreasing alkaline and acid phosphating baths

Degreasing bath: Industrial type alkaline soap, 5% concentration in water, pH 12, T 60° C., immersion time 7 minutes.

Phosphating bath: Industrial type zinc phosphating, pH 2.2, T 55° C., immersion time 3 minutes.

The coated specimens remained unaltered after immersion in the baths. The percentage of area found to have been destroyed or peeled off after this operation was less than 1% according to microscopic assessment.

II Corrosion resistance

Test conditions as per ASTM B117 with evaluation of the increase in time to appearance of red rust compared with specimens without the organic coating.

The coated specimens exhibited an increase in corrosion resistance more than 300% compared with the bare specimens.

III Cataphoretic paintability and paint adhesion to substrate

It was found that, under the same operating conditions, the thicknesses of cataphoretic paints deposited on the bare and the coated specimens are identical. Wet Adhesion and Cathodic Wet Adhesion, between cataphoretic paint and organic film is comparable or better than that between paint and the best phosphate treatment for zinc.

|  |  | Percent area peeled off | |
|---|---|---|---|
|  |  | WA | CWA |
| Bare specimen | A | 70 | 100 |
| Coated specimen | A | 1 | 2 |
| Bare specimen | B | 3 | 5 |
| Coated specimen | B | <1 | 1 |

A = industrial phosphating cycle with high-Zn phosphating bath
B = industrial phosphating cycle with Zn/Ni/Mn phosphating bath
WA = Wet Adhesion
CWA = Cathodic Wet Adhesion Wet Adhesion
Conditions:
Incised with 2×2 mm grid
Immersion in distilled water at 40° C. for one week
Covering test area with adhesive tape strip, and removing the same
Evaluation with automatic image analyzer (QTM) of percent area of paint removed by the tape strip.
Cathodic Wet Adhesion
Conditions:
Incised with 2×2 mm grid
Immersion in 0.5N NaCl solution at room temperature for 24 h and contemporary imposition of 30 μA/cm² cathodic current
Covering test area with adhesive tape and removing the same
QTM evaluation of percentage of paint removed by tape strip.

IV Wear resistance during forming

This test is performed pulling a strip of material through a clamping device having either a flat clamp and a convex clamp (flat tools) or a concave clamp and a convex clamp (draw-bead tools). In the latter case the strip moves obviously in a curved path.

In our tests bare and coated strips of 15×350 mm and 30×350 mm (with flat tools) and of 15×350 mm (for draw-bead tools) were pulled for 200 mm through testing devices, with a speed of 500 mm/min.

Bare specimens were lubricated.

It was observed that un-lubricated coated strips suffered much less surface damage than lubricated bare specimens; in fact detritus collected from tests of bare specimens was 400% more abundant than detritus collected from tests of coated specimens.

V Weldability

Spot weldability conditions for sheet with an organic film are broader and there is a shift towards lower currents.

After 3000 spot welds on a pair of two-side-clad, superimposed sheets, there was no evidence of variations in the shear strength of the weld.

| Weldability conditions | |
|---|---|
| Electrode diameter | 5.5 mm |
| Clamping load | 2.3 kN |
| Hold time (HT) | 30 cycles (50 Hz) |

We claim:
1. A metal member having a surface continuous coating thereon consisting essentially of cured epoxy resin having a thickness of up to 2 μm, an epoxy equivalent between 500 and 2,000, that cures at temperatures no higher than 200° C., that has an ultimate elongation greater than 10% and an electrical insulation resistance less than 2,000 Ohm/cm$^2$.
2. A metal member as claimed in claim 1, which is a steel sheet.
3. A metal member as claimed in claim 1, in which said coating has a thickness less than 1 μm.
4. A metal member as claimed in claim 1, in which said coating has a thickness of about 0.8 μm.
5. A metal member as claimed in claim 1, in which said resin has a curing rate not exceeding 2 minutes.

* * * * *